(12) United States Patent
Reuter

(10) Patent No.: US 10,987,682 B2
(45) Date of Patent: Apr. 27, 2021

(54) METERING VALVE

(71) Applicant: Marco Systemanalyse und Entwicklung GmbH, Dachau (DE)

(72) Inventor: Martin Reuter, Dachau (DE)

(73) Assignee: Marco Systemanalyse und Entwicklung GmbH

( * ) Notice: Subject to any disclaimer, the term of this patent is extended or adjusted under 35 U.S.C. 154(b) by 0 days.

(21) Appl. No.: 16/413,568

(22) Filed: May 15, 2019

(65) Prior Publication Data

US 2019/0358655 A1 Nov. 28, 2019

(30) Foreign Application Priority Data

May 24, 2018 (DE) .......................... 102018112473.2

(51) Int. Cl.
*B05B 7/08* (2006.01)
*B05B 15/00* (2018.01)
*G01F 11/28* (2006.01)

(52) U.S. Cl.
CPC ................ *B05B 7/08* (2013.01); *B05B 15/00* (2013.01); *G01F 11/282* (2013.01)

(58) Field of Classification Search
CPC ......... B05B 7/08; B05B 15/00; B05C 5/0216; B05C 5/0275; B05C 5/0279; B65G 47/26; G01F 11/282; B05D 3/141; B29C 66/028

See application file for complete search history.

(56) References Cited

U.S. PATENT DOCUMENTS

| | | | |
|---|---|---|---|
| 6,537,605 B1* | 3/2003 | Kirchner | C23C 4/00 118/302 |
| 2006/0172081 A1 | 8/2006 | Flinn et al. | |
| 2010/0096086 A1 | 4/2010 | Minkow et al. | |
| 2013/0272835 A1 | 10/2013 | Nally et al. | |
| 2015/0069911 A1* | 3/2015 | Nettesheim | G01F 1/00 315/111.21 |
| 2016/0121134 A1 | 5/2016 | Kalghatgi et al. | |

FOREIGN PATENT DOCUMENTS

| | | |
|---|---|---|
| DE | 102009031954 A1 | 1/2010 |
| DE | 102013109887 A1 | 3/2015 |
| DE | 102014110405 A1 | 1/2016 |
| DE | 102016119627 A1 | 4/2018 |
| JP | 2004096451 A1 | 3/2004 |
| JP | 2010527096 A | 8/2010 |
| JP | 2016510483 A | 4/2016 |

OTHER PUBLICATIONS

Communication received from the German Patent and Trademark Office for related German Patent Application No. 102018112473.2; dated Apr. 8, 2019; 10 pages.
Official Communication from the Japanese Patent Office for related Japanese Application No. 2019093299; dated Apr. 7, 2020; 3 pages.

* cited by examiner

*Primary Examiner* — George R Koch
(74) *Attorney, Agent, or Firm* — Dickinson Wright PLLC

(57) ABSTRACT

A metering valve comprises a closable media passage leading from a media supply to a nozzle opening, wherein the medium can be applied to the workpiece in a metered manner through the nozzle opening. The metering valve is provided with a plasma generator by which the workpiece can be acted on by a plasma jet.

7 Claims, 2 Drawing Sheets

METERING VALVE

Figure 1:
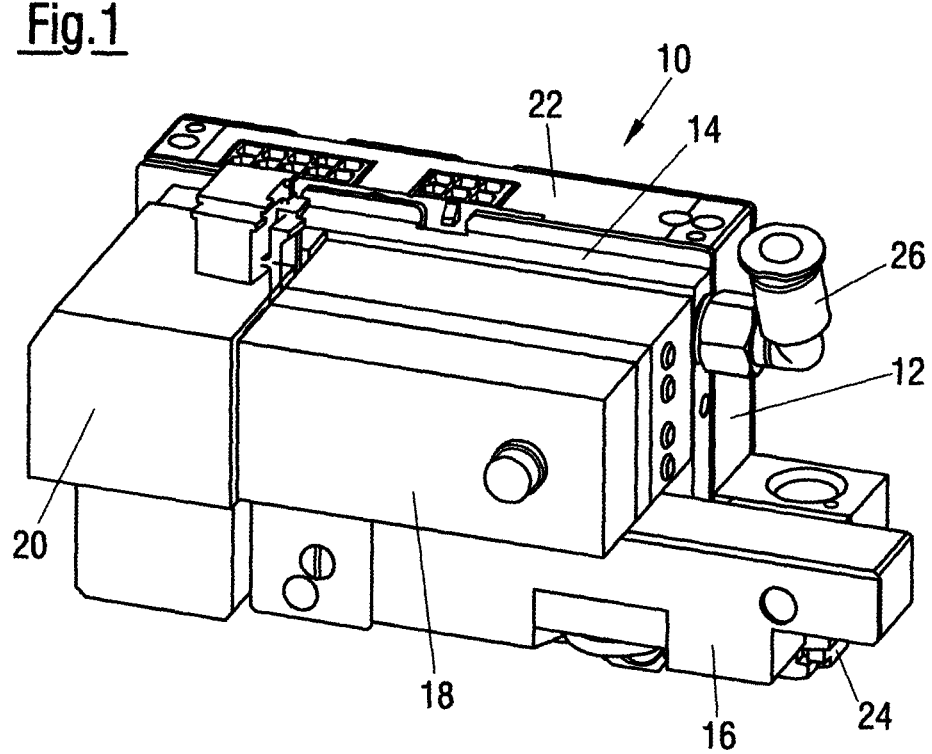

The present invention relates to a metering valve for liquid media in accordance with the preamble of claim 1.

Adhesive bonding processes are required for a large number of production steps in the production of electronic components and devices such as smartphones and tablets. To increase the durability of the adhesive bond and to improve and ensure the process stability of the adhesive bond, the surfaces of the workpiece to be adhesively bonded are frequently activated by a plasma. The wetting of the adhesive on the workpiece surface is thereby considerably improved and the adhesive bonding process is thus also improved. This is above all important for nonpolar materials such plastics that comprise long polymer chains. Nonpolar surfaces are more difficult to coat and to adhesively bond. However, the surface tension of the adherend can be directly modified by the plasma energy introduced, whereby new material bonds can be created in the adhesive bonding process.

Plasma activation has to date typically taken place in a separate process prior to the application of the adhesive. It has, however, been recognized that the application of the adhesive should take place as fast as possible after the plasma activation since the activation of the workpiece surface is not permanent. Some of the activation is therefore already lost in separate processes again before the adhesive is applied.

It is therefore the object of the present invention to provide a metering valve in accordance with the preamble of claim 1 with which improved adhesive bonds can be achieved.

This object is satisfied by the features of claim 1 and in particular in that the metering valve is provided with a plasma generator by which the workpiece can be acted on by a plasma jet. The plasma activation and the application of adhesive can thus take place in one and the same process step using the metering valve in accordance with the invention. The adhesive bond can hereby be improved, on the one hand, and the cycle times can also be reduced, on the other hand, since the plasma treatment can be carried out in one and the same process station.

Advantageous embodiments of the invention are described in the description, in the drawing and in the dependent claims.

In accordance with a first advantageous embodiment, the plasma jet can emanate next to the nozzle opening. The metering valve hereby only has to be traveled by a very small distance relative to the workpiece after the plasma treatment until the medium can be applied at the position previously treated by the plasma jet.

In accordance with a further advantageous embodiment, the plasma generator can comprise a gas supply and a piezo transformer. Such a piezo transformer is very small in construction, has a low weight, and is able to generate the high voltage required for an ionization of a supplied gas.

In accordance with a further advantageous embodiment, a gas passage can be provided in the metering valve and its outlet opening is arranged next to the nozzle opening. A compact design with small dimensions can hereby be achieved.

In accordance with a further advantageous embodiment, the metering valve can be provided with a camera by which an image of the workpiece surface can be transferred. Such a camera can be used for process monitoring in that the plasma generation is monitored, for example. In addition, the camera can be used for configuring and monitoring a robot movement and the metering position. A process control of the metering is furthermore also possible with the aid of the camera. For this purpose, the robot to which the metering valve in accordance with the invention is attached, can travel to defined positions on the workpiece after the application of the medium or adhesive has taken place and can determine droplet sizes or line widths and the position of the applied medium by means of the camera.

In accordance with a further advantageous embodiment, the detection zone of the camera can intersect the plasma jet, whereby an image of the plasma jet incident on the workpiece surface can be transferred by the camera. Since the plasma jet is easily recognizable from a visual or color aspect, an onsite process monitoring of the plasma generation can hereby take place.

In accordance with a further advantageous embodiment, the axis of the plasma jet, the trajectory of the metered medium, and the optical axis of the camera can extend in parallel with one another and can in particular be arranged in a common plane. The robot hereby only has to travel along a single axis and also only a very little to first apply the plasma jet to a point of the workpiece, to subsequently apply the medium to the point previously treated by the plasma jet, and to monitor the performed process steps with the camera.

In accordance with a further advantageous embodiment, on a use of a piezo transformer, its longitudinal axis can extend at an oblique angle to the axis of the plasma jet. The piezo transformer can hereby be arranged in a space saving (slanted) manner in the metering valve to obtain a compact overall arrangement.

A simple assembly and a high service friendliness can be achieved when the plasma generator and the camera are each configured as modules.

In accordance with a further advantageous embodiment, a processing unit can be provided at the metering valve that controls a pressure regulation unit provided in a gas passage of the plasma generator. A fine setting and a measurement or monitoring of the pressure of the gas supplied for the generation of the plasma can hereby take place.

The present invention will be described in the following purely by way of example with reference to an advantageous embodiment and to the enclosed drawings.

Figure 2:
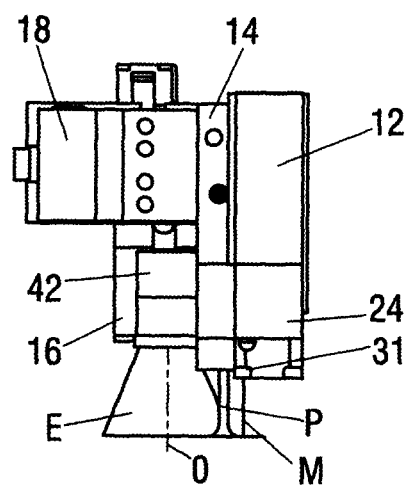
Figure 3:
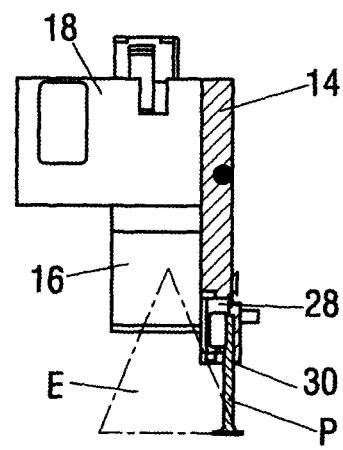
Figure 4:
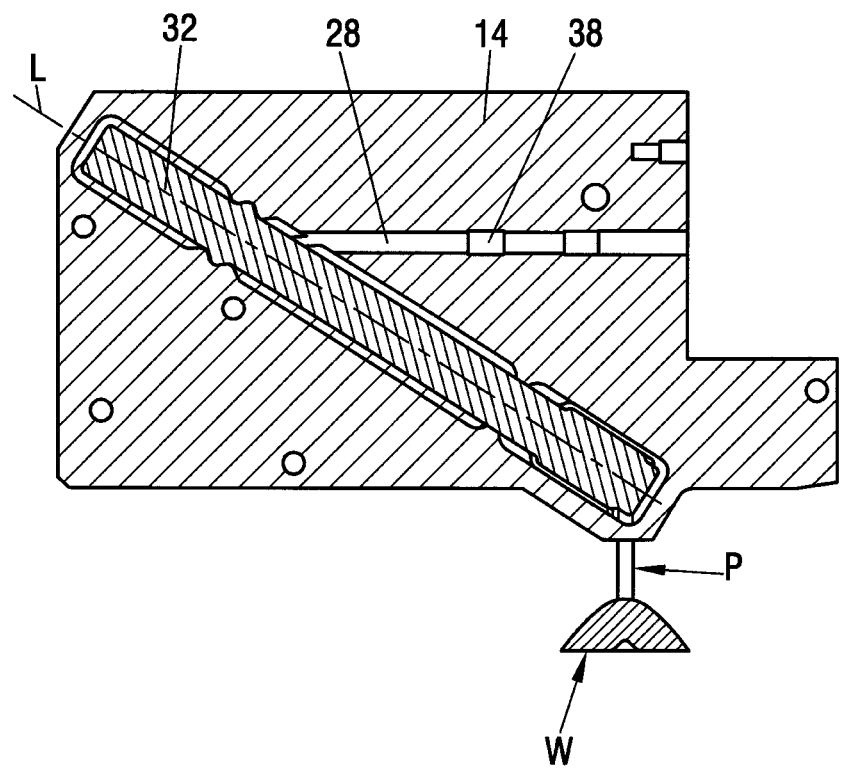
Figure 5:
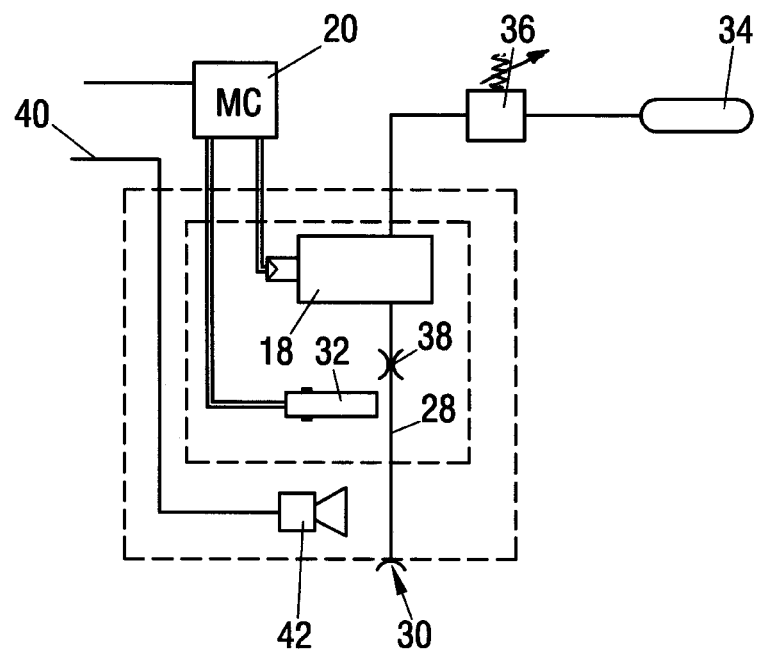

There are shown:

FIG. 1 a perspective view of a metering valve;

FIG. 2 a plan view of the end face of the metering valve of FIG. 1;

FIG. 3 a partly sectional view of the representation of FIG. 2;

FIG. 4 a partly sectional view through the plasma generator of the metering valve of FIG. 1; and FIG. 5 a schematic plan of the metering valve of FIG. 1.

The metering valve 10 shown perspectively in FIG. 1 is of a modular design and comprises a valve module 12, a plasma generator module 14, and a camera module 16 that are arranged next to one another and are connected to one another. A pressure regulation valve 18 and a processing unit 20 for controlling the metering process are additionally located at the metering valve 10.

The valve module 12 has a closable media passage leading from a media supply not shown, to a nozzle opening 31, a generally known valve drive 22, and a replaceable valve core 24. The valve drive and the vale core here correspond to the metering valves typically used for metering applications and known from the prior art.

The plasma generator module 14 is fastened directly to a main surface of the generally parallelepiped-shaped valve module 12, is likewise parallelepiped-shaped, and has a gas connector 26 and a gas passage 28 that extends through the plasma generator module 14 and has an outlet opening 30 that is directed perpendicularly downward in the position of the metering valve 10 shown and is arranged directly next to the nozzle opening 31. The gas conducted through the gas passage 28 and ionized before discharge is applied as a plasma jet P perpendicular to a workpiece surface W.

As the cross-section through the plasma generator module 14 of FIG. 4 illustrates, it has a piezo transformer 32 that is formed as an elongate bar, that is arranged diagonally in the generally parallelepiped-shaped plasma generator module 14, and that generates a high voltage at its lower end (its right end in FIG. 4). FIG. 4 here illustrates that the axis of the plasma jet P extends at an oblique angle to the longitudinal axis L of the piezo transformer 32, and indeed at an obtuse angle of approximately 120° in the embodiment shown. Gas that flows through the gas passage 28 is supplied from a pressure container 34 (FIG. 5) filled with helium or nitrogen, for example, via a mechanical pressure regulator 36 to the gas connector 26. Shortly before the discharge through the outlet opening 30 of the gas passage 28, the gas is ionized by the high voltage generated by the piezo transformer 32 and is subsequently discharged as cold plasma P. The pressure of the process gas is preferably set to a value sensible for the application via the mechanical pressure regulator 36. A fine setting and a measurement or monitoring of the pressure subsequently takes place by a pressure regulator 18 regulated by the processing unit 20. A diaphragm 38 via which the volume flow of the gas can be set is provided in the gas passage 28 after the pressure regulator in the direction of flow.

FIG. 1 further illustrates that the likewise approximately parallelepiped-shaped camera module 16 is arranged and fastened at a main surface of the plasma generator module 14. A camera 42 by which an image of the workpiece surface W can be transferred is installed in this camera module 16 and is provided with a USB connection 40 (FIG. 5). FIGS. 2 and 3 illustrate the detection zone E of the camera 42 directed perpendicularly downwardly and it can easily be recognized that this image detection zone intersects the plasma jet P so that an image of the plasma jet P incident on the workpiece surface W can be captured by the camera 42.

It furthermore becomes clear from FIG. 2 that the optical axis O of the camera 42, the axis of the plasm jet P, and the trajectory M of the metered medium extend in parallel with one another. They are furthermore also arranged on a straight line disposed in the plane of the drawing of FIG. 2.

The processing unit 20 that is provided with a microcontroller controls both the plasma generator 14 and the pressure regulator 18. The processing unit 20 is furthermore connected to a higher ranking processing unit to which the camera 42 and the control electronics of the valve module 22 are also connected. The process monitoring and the synchronization and control of the plasma generation as well as the metering and the robot movement take place via this higher ranking processing unit.

In accordance with a further embodiment, not shown, the valve module 22 and the plasma generator module 14 can also be provided with a nozzle passage extension. The installation height of the camera 42 can then be adapted accordingly.

The invention claimed is:

1. A metering valve for liquid medium, the metering valve comprising a closable medium passage leading from a medium supply to a nozzle opening, wherein the medium can be applied to a workpiece in a metered manner through the nozzle opening;
    the metering valve is provided with a camera by which an image of a surface of the workpiece can be transferred;
    the metering valve is provided with a plasma generator by which the workpiece can be acted on by a plasma jet; and wherein
    a detection zone of the camera intersects the plasma jet, whereby an image of the plasma jet incident on the workpiece surface can be captured by the camera and communicated to a processing unit to regulate metering of the medium and to control the plasma jet, wherein an axis of the plasma jet, a trajectory of the metered medium, and an optical axis of the camera extend in parallel with one another, wherein the axis of the plasma jet, the trajectory of the metered medium, and the optical axis of the camera are arranged in a common plane and communicated to a processing unit to regulate metering of the medium and to control the plasma jet, wherein an axis of the plasma jet, a trajectory of the metered medium, and an optical axis of the camera extend in parallel with one another, wherein the axis of the plasma jet, the trajectory of the metered medium, and the optical axis of the camera are arranged in a common plane.

2. The metering valve in accordance with claim 1, wherein the plasma jet emanates next to the nozzle opening.

3. The metering valve in accordance with claim 1, wherein the plasma generator comprises a piezo transformer and a gas supply.

4. The metering valve in accordance with claim 3, wherein a longitudinal axis of the piezo transformer extends at an oblique angle to the axis of the plasma jet.

5. The metering valve in accordance with claim 1, wherein a gas passage is provided therein whose outlet opening is arranged next to the nozzle opening.

6. The metering valve in accordance with claim 1, wherein the plasma generator and the camera are each configured as modules.

7. The metering valve in accordance with claim 1, wherein the plasma generator has a gas passage in which a pressure regulation unit is provided that is controlled by the processing unit provided at the metering valve.

\* \* \* \* \*